Nov. 11, 1941.  G. R. KELM  2,262,143
MACHINE FOR FORMING HOLLOW PLASTIC BODIES
Filed Feb. 23, 1940  2 Sheets-Sheet 1

INVENTOR,
Gustav R. Kelm,
BY
John W. Leward.
ATTORNEY.

Patented Nov. 11, 1941

2,262,143

UNITED STATES PATENT OFFICE 2,262,143

MACHINE FOR FORMING HOLLOW PLASTIC BODIES

Gustav R. Kelm, Paterson, N. J.

Application February 23, 1940, Serial No. 320,351

1 Claim. (Cl. 308—37)

This invention relates to the forming of hollow bodies from a substance, as latex, which at the outset exists in liquid state but during the forming sets or assumes a solid state; the invention relates particularly to that branch of this art in which a suitable quantity of the substance is placed in a mold, being less than enough to fill the same, and then the mold is rotated around crossing axes, usually in the presence of heat, whereby during the setting of the substance to distribute it over the interior surface of the mold. During the rotation the mold is also usually subjected to agitation, as by effecting the rotation intermittently.

Generally stated, a machine for this purpose has heretofore included, with a closed chamber containing water to be steam-heated, a suitably rotated carrier comprising a horizontal shaft and a block penetrated by and keyed to the shaft, the body and cover sections of each of usually two molds, and mold-holders journaled in the block on axes crossing the axis of the carrier and each equipped with a series of radial equidistant studs or pins intended in the rotation of the carrier successively to engage an abutment or stop on a part of the fixed structure of the machine thus to cause intermittent rotation of such mold-holder around its own axis. The bearing for each mold-holder in the carrier was a headed pin which was passed through a bore in its body section and screwed into the block; the pin had to be limited in thickness and of relatively considerable length, wherefore it frequently broke off or at least became bent, especially since the mentioned expedient for causing the intermittent rotation of the mold-holder was not such unerringly to avoid one of the studs of the latter at times engaging the mentioned abutment endwise of itself, thus producing a cramped state of these two parts and strain on the bearing pin.

According to this invention the block and mold-holder are intercoupled for the rotation of the latter around its own axis directly and in a way calculated to produce increased strength and durability in the combination of these parts and also facilitate the assembling and disassembling thereof. As for the intermittent rotation of the mold-holder around its own axis, the construction is such that the possibility of the mold-holder assuming a cramped or strained state with respect to the abutment is entirely absent.

Figure 1:
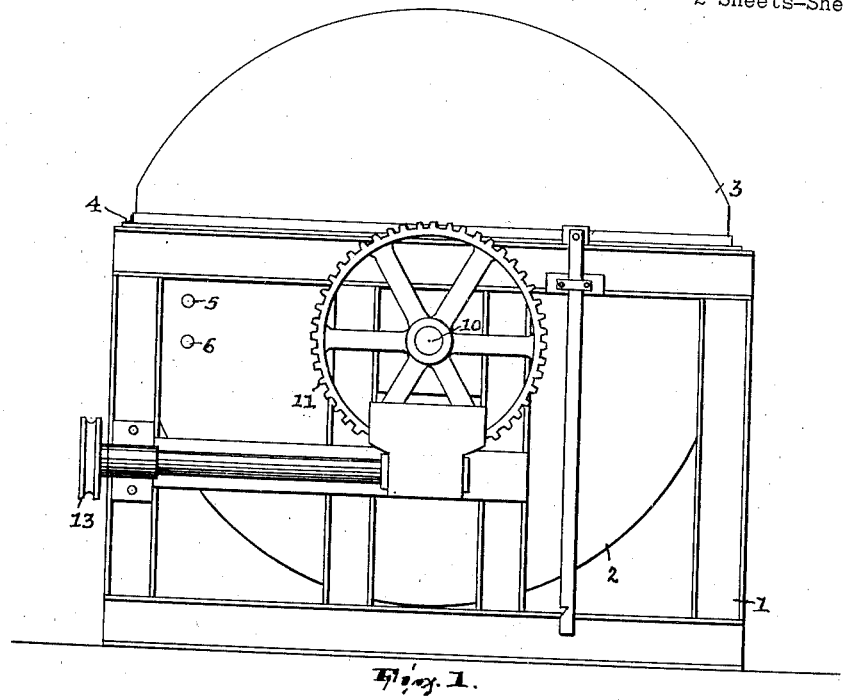
Fig. 1 is a front elevation of the apparatus.
Figure 2:
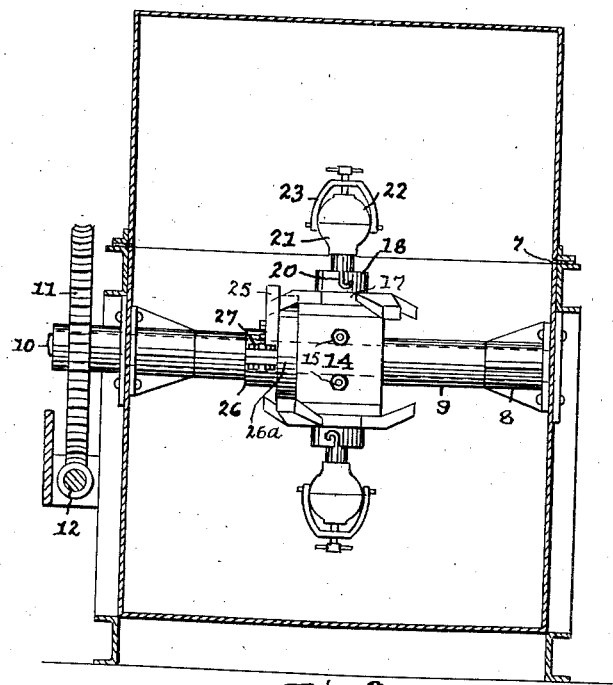
Fig. 2 is a sectional view thereof, showing the interior mechanism in elevation.

There is the usual fixed structure 1 providing a chamber 2 having a cover 3 hinged at 4 and a steam-inlet 5 and water-overflow outlet 6. At 7 is suitable means to seal the joint between the chamber and its cover. Parts of the fixed structure are alined bearing members 8 and sleeves 9 projecting inwardly from the bearing members. During a treatment water occupies the chamber to a level near that of the sleeves and steam is admitted at inlet 5.

One part of the carrier is the shaft 10 journaled in the mentioned bearings and carrying a worm-gear 11 in mesh with a worm 12 to be rotated from any motor, as through a belt engaged with a pulley 13 on the worm. Another part of the carrier is a block 14 square in plan and divided in a plane parallel with two of its opposed faces, the two sections having a common bore which fits the shaft and being clamped thereto by bolts 15. The two sections have, also in common, a pair of bearing recesses or bearings 16 open at two other opposed faces of the block and each of which is formed at its inner end with a concentric groove or annular enlargement 16a, they having a common axis perpendicular to the axis of the carrier.

17 designates the mold-holders each formed with a central head 17a having at what may be termed its outer end a circumferential flange 17b, the body of the head and the flange being of a size and shape to fit, respectively, bearing 16 and its groove 16a. Each mold-holder is formed with approximately four radial equidistant arms 17c, giving it the form of a star-wheel. Each mold-holder also has an outer central hub 18 and an axial socket 19 and it is formed with opposed J-shaped slots 20 entering from its free end. Contained in the socket is a spring x.

21 and 22 are, respectively, the body and cover sections of a mold and 23 a bail pivoted to the former and having a hand-screw 24 to bear against the latter and forming means to secure the body and cover in mold-forming relation to each other. The stem 21a of the body section has opposite pins 21b which, when the stem is entered into socket 19 and seats on the spring, enter the slots to form a bayonet-joint.

An abutment here consisting of a pawl 25 is fast to the flange 26a of a collar 26 clamped to one sleeve 9 by screws 27, thus forming part of the fixed structure of the machine.

It is noted that the joint between the carrier and each mold-holder formed by the bearing 16 and head 17a provides at 16a—17b a direct interlock against displacement of the mold-holder axially of the bearing or is devoid of a third part to form a journal, which of course results in a strong and durable combination, especially if a material part of the area of the block and mold-holder is availed of, as shown, to form the joint; further that the parts including a mold-holder and the components of the carrier may be readily assembled and disassembled.

Figure 3:
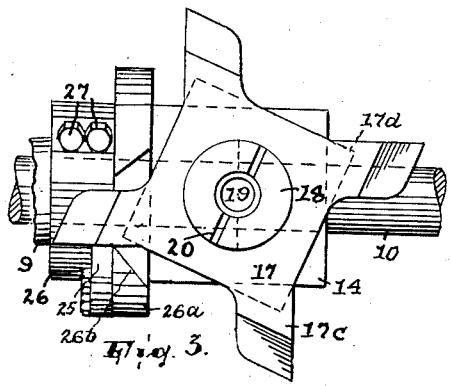
Fig. 3 is an elevation of a part of the fixed structure, the carrier and one mold-holder, viewing the latter axially.

The star-wheel formed on each mold-holder has a depending projection 17d, square in plan (Fig. 3). The adjoining face of flange 26a is in a plane, perpendicular to the carrier axis, with which any lateral face of this projection exists in close face-to-face relation when it stands perpendicular to said axis. Therefore whenever the mold-holder is in a position in which any such lateral face is presented to the flange the latter holds the mold-holder stationary. When an arm of the star-wheel, on each rotation of the corresponding mold-holder around the carrier axis, encounters the pawl 25 and thus receives a rotary impulse the flange will cease its effort to hold the mold-holder against rotation. This is accomplished by providing in the flange a recess 26b in such relation to the pawl as to receive the adjacent corner of the projection 17d as it seeks to pass through the mentioned plane of substantial coincidence of the adjoining face of the flange and projection. Of course, each arm of the star-wheel projects beyond a circle concentric therewith which is cut by the said plane; and the arms are desirably bent inward to insure their complete coaction with the pawl.

Figure 4:
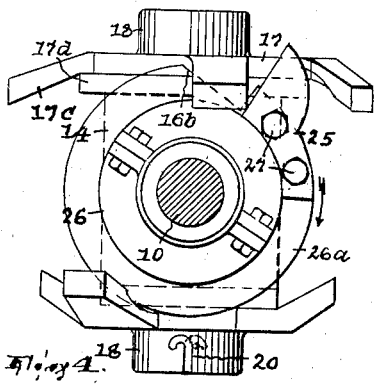
Fig. 4 is a left side elevation of what appears in Fig. 3, with the shaft 10 in section.
Figure 5:
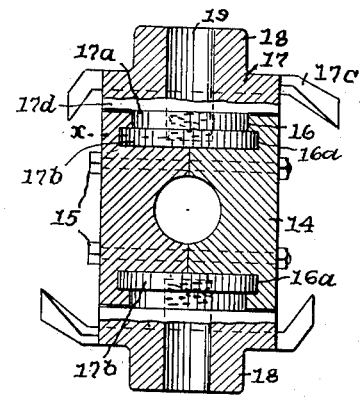
Fig. 5 shows the carrier and mold-holders partly in section and partly in elevation, shaft 10 being removed.
Figure 6:
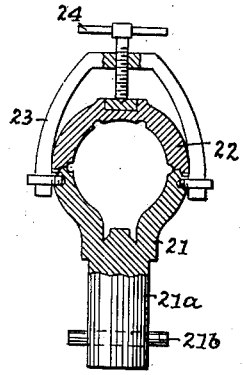
Fig. 6 shows one of the molds partly in side elevation and partly in section.

When the carrier is driven (arrow, Fig. 4) and carries each mold-holder around, the latter in each cycle is held by the flange of collar 26 stationary for approximately 270°, whereupon, one of the arms 17c encountering the pawl, the mold-holder is turned on its own axis through the remaining 90°. The relation of the flange 26a to the projection 17d of each mold-holder insures that the latter by the flange shall be positively held stationary at spaced intervals in each cycle around its own axis and, in alternation with such intervals, freed by the recess of the flange so as to undergo a partial rotation by the pawl, wherefore cramping or straining or other undue interengagement of the pawl and an arm of the mold-holder is invariably avoided.

The intermittent rotation of a mold-holder is present to insure as uniform distribution of the latex in its mold as possible. But it frequently occurs, especially in the case of molds of irregular form, that the product develops too thick-walled in some places and too thin-walled in others, apparently because gravity intervenes as an augmenting force active on the latex. Hence, the collar 26, with its pawl, is adapted to be adjusted around the sleeve 9 so as to cause a partial rotation of a mold-holder at a point in its travel with the carrier where gravity will be the least effective as a disturbing influence.

Having thus fully described my invention what I claim is:

In a machine of the class set forth, the combination of a shaft, a block divided into two sections together formed with a bore receiving the shaft, means to hold the block sections together and clamped to the shaft, said sections together providing an outwardly open bearing whose axis crosses the axis of the shaft, and a rotary member having a bearing portion journaled in said bearing, said bearing and bearing portion having an interlock limiting displacement of the bearing portion axially of the bearing in either direction.

GUSTAV R. KELM.